(12) United States Patent
An (10) Patent No.: US 8,726,685 B2
(45) Date of Patent: May 20, 2014

(54) WATER TANK FOR REFRIGERATOR, MANUFACTURING METHOD OF WATER TANK FOR REFRIGERATOR, AND REFRIGERATOR HAVING WATER TANK FOR REFRIGERATOR

(75) Inventor: Jae Koog An, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 503 days.

(21) Appl. No.: 12/926,493

(22) Filed: Nov. 22, 2010

(65) Prior Publication Data

US 2011/0126577 A1    Jun. 2, 2011

(30) Foreign Application Priority Data

Dec. 2, 2009 (KR) .................. 10-2009-0118520

(51) Int. Cl.
*F25D 23/12* (2006.01)
(52) U.S. Cl.
USPC .............................. 62/338; 62/337

(58) Field of Classification Search
USPC .............................. 62/338–339; 264/512–514
See application file for complete search history.

(56) References Cited

U.S. PATENT DOCUMENTS

| | | | | |
|---|---|---|---|---|
| 1,741,594 A * | 12/1929 | Vollmer | ......................... | 62/339 |
| 2,267,819 A * | 12/1941 | Di Pietro | ........................ | 62/394 |
| 4,571,953 A * | 2/1986 | Caruso | ............................. | 62/339 |
| 5,542,264 A * | 8/1996 | Hortin et al. | .................... | 62/338 |
| 7,067,054 B2 * | 6/2006 | Fritze | .............................. | 210/85 |

* cited by examiner

*Primary Examiner* — Cassey D Bauer
(74) *Attorney, Agent, or Firm* — Staas & Halsey LLP (57) ABSTRACT

A water tank for a refrigerator that withstands high pressure and prevents leakage of water and a refrigerator having the same. The water tank includes a plurality of water storage containers to store water and at least one communication member through which the water storage containers communicate with each other. The water storage containers and the at least one communication member are integrally formed by injection molding. Joints are considerably reduced, thereby reducing manufacturing costs, simplifying a manufacturing process, and improving productivity.

13 Claims, 8 Drawing Sheets

WATER TANK FOR REFRIGERATOR, MANUFACTURING METHOD OF WATER TANK FOR REFRIGERATOR, AND REFRIGERATOR HAVING WATER TANK FOR REFRIGERATOR

CROSS-REFERENCE TO RELATED APPLICATIONS

This application claims the benefit of Korean Patent Application No. KR 10-2009-0118520, filed on Dec. 2, 2009 in the Korean Intellectual Property Office, the disclosure of which is incorporated herein by reference.

BACKGROUND

1. Field

Embodiments relate to a water tank for a refrigerator manufactured with improved quality and at reduced costs, a manufacturing method of the water tank, and a refrigerator having the water tank.

2. Description of the Related Art

Generally, a refrigerator is an apparatus that supplies cool air generated by a refrigeration cycle into a storage chamber to keep food fresh for a long time.

The refrigerator includes a dispenser to allow a user to dispense drinking water without opening a door and an ice maker to make ice in the storage chamber. Also, the refrigerator includes a water tank to store and supply water to the dispenser or the ice maker.

However, conventional water tanks have several joints, from which leakage of water may occur. In addition, the conventional water tanks may not withstand water pressure, with the result that the conventional water tanks may expand slightly.

Also, components of each water tank are separately manufactured and then assembled, thereby increasing manufacturing costs.

SUMMARY

It is an aspect to provide a water tank for a refrigerator that withstands high pressure and prevents leakage of water, a manufacturing method of the water tank, and a refrigerator having the water tank.

It is another aspect to provide a water tank for a refrigerator manufactured at reduced manufacturing costs, a manufacturing method of the water tank, and a refrigerator having the water tank.

Additional aspects will be set forth in part in the description which follows and, in part, will be apparent from the description, or may be learned by practice of the invention.

In accordance with one aspect, a water tank for a refrigerator includes a plurality of water storage containers to store water, a plurality of water storage container caps respectively coupled to corresponding ends of the water storage containers, and at least one communication member provided at the other ends of the water storage containers such that the water storage containers communicate with each other through the at least one communication member, wherein the water storage containers and the at least one communication member are integrally formed by injection molding.

The water storage container caps may be joined to the water storage containers by welding.

The at least one communication member may include at least one leakage prevention cap provided at one end thereof to prevent leakage of water.

The at least one leakage prevention cap may be joined to the at least one communication member by welding.

The water storage containers may be formed in at least one sectional shape selected from the group consisting of a circle, an oval and a quadrangle.

The water tank may be horizontally disposed, and the water storage containers may be inclined to each other to easily discharge air from water.

The water tank may be vertically disposed.

The water tank may further include an inlet port through which water is introduced and an outlet port through which water is discharged, wherein the inlet port may be disposed at one of the water storage container caps, and the outlet port may be disposed at one of the water storage container caps or the at least one communication member.

The inlet port and the outlet port may include pipe connections to which a water supply pipe is connected, and each of the pipe connections may include a collet to which the water supply pipe is connected, a grommet to prevent leakage of water, a fixer to fix the grommet, and a clip to prevent movement of the collet.

The inlet port and the outlet port may be joined to a water supply pipe by welding.

In accordance with another aspect, a refrigerator includes a dispenser to dispense water and a water tank to store water to be supplied to the dispenser, the water tank including a plurality of water storage containers to store water, a plurality of water storage container caps respectively coupled to corresponding ends of the water storage containers, and at least one communication member provided at the other ends of the water storage containers such that the water storage containers communicate with each other through the at least one communication member, wherein the water storage containers and the at least one communication member are integrally formed to prevent leakage of water.

The water storage container caps may be joined to the water storage containers by welding.

The at least one communication member may include at least one leakage prevention cap provided at one end thereof to prevent leakage of water.

The at least one leakage prevention cap may be joined to the at least one communication member by welding.

The water storage containers may be formed in at least one sectional shape selected from the group consisting of a circle, an oval and a quadrangle.

In accordance with a further aspect, a manufacturing method of a water tank for a refrigerator includes preparing a mold to integrally form a plurality of water storage containers to store water and at least one communication member provided at corresponding ends of the water storage containers such that the water storage containers communicate with each other through the at least one communication member and pouring molten resin in the mold to integrally form the water storage containers and the at least one communication member by injection molding.

The manufacturing method may further include joining a plurality of water storage container caps to the other ends of the water storage containers by welding.

The manufacturing method may further include joining at least one leakage prevention cap to one end of the at least one communication member by welding.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Figure 1:
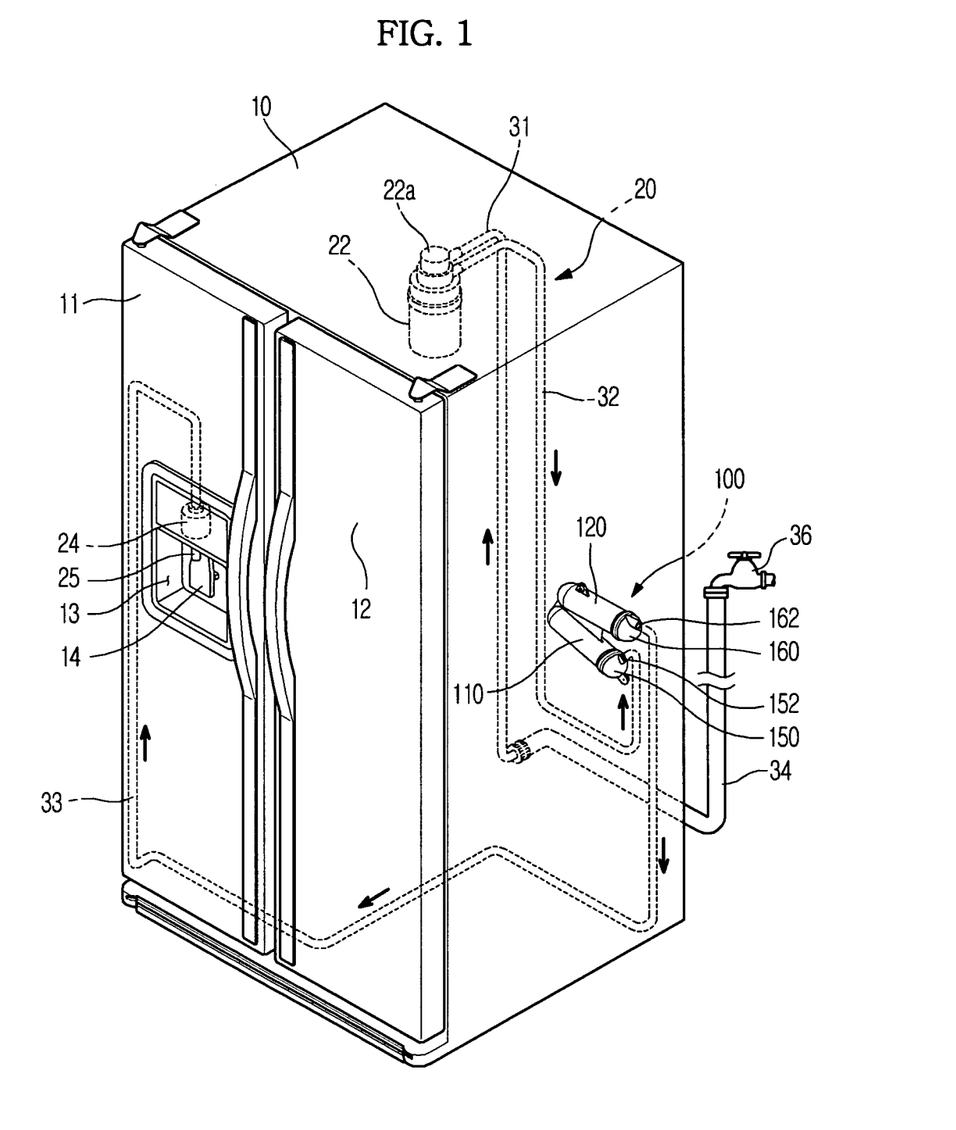
FIG. 1 is a perspective view illustrating a refrigerator according to an embodiment to which a water tank is applied.

FIG. 1 is a perspective view illustrating a refrigerator according to an embodiment to which a water tank is applied.

The refrigerator includes a refrigerator body 10 having a left freezing chamber (not shown) and a right refrigerating chamber (not shown) partitioned therein and a freezing chamber door 11 and a refrigerating chamber door 12 mounted at opposite sides of the front of the refrigerator body 10 to open and close the freezing chamber and the refrigerating chamber. Although not shown in the drawing, a cooling system to cool the freezing chamber and the refrigerating chamber is mounted in the refrigerator body 10. The cooling system includes an evaporator, a condenser, a compressor, and a refrigerant expansion device in the same manner as a general refrigerator. The positions of the freezing chamber and the refrigerating chamber may be changed.

In the freezing chamber door 11 is provided a dispenser 13 to allow a user to take water out without opening the freezing chamber door 11. The dispenser 13 is depressed rearward from the front of the freezing chamber door 11 by a predetermined depth. FIG. 1 illustrates that the dispenser 13 is provided in the freezing chamber door 11 although the dispenser 13 may be provided in the refrigerating chamber door 12.

At the upper part of the dispenser 13 is provided water dispensing port 25 to dispense water. In the refrigerator body 10 and the freezing chamber door 11 is provided a water supply system 20 to supply water to the water dispensing port 25. The water supply system 20 includes first to third water supply pipes 31, 32 and 33 to guide water supplied to an external water supply source 36 to the water dispensing port 25, a water purification filter 22 to purify water, a water tank 100 to store water in a cooled state, and a water supply valve 24 to open and close the water dispensing port 25.

The first water supply pipe 31 is connected to the external water supply source 36 (for example, a faucet) via a connection pipe 34. The water purification filter 22 is detachably mounted to a filter socket 22a provided in the refrigerating chamber at the upper part thereof. The first water supply pipe 31 is connected to the filter socket 22a. Water supplied from outside is introduced into the water purification filter 22, where the water is purified, via the first water supply pipe 31.

The water tank 100 stores a predetermined amount of water purified by the water purification filter 22. The water tank 100 has an inlet port 152 connected to the water purification filter 22 via the second water supply pipe 32 and an outlet port 162 connected to the water dispensing port 25 of the freezing chamber door 11 via the third water supply pipe 33. The water tank 100 is horizontally mounted in the refrigerating chamber at the rear thereof to keep the water purified by the water purification filter 22 cool. The water tank 100 is exposed to cool air in the refrigerating chamber, with the result that the water in the water tank 100 is kept cool.

The water supply valve 24 is mounted above the dispenser 13 such that the water supply valve 24 is connected to the water dispensing port 25. When a user pushes a manipulation lever 14 provided in the dispenser 13, the water supply valve 24 opens the water dispensing port 25 such that water is dispensed from the water dispensing port 25. The first to third water supply pipes 31, 32 and 33 constituting a water supply channel are buried in insulation layers of the refrigerator body 10 and the freezing chamber door 11.

FIG. 1 illustrates that the water tank 100 is connected to the water dispensing port 25 via the third water supply pipe 33. For a refrigerator having an ice maker (not shown) mounted in the freezing chamber, a water supply pipe (not shown) and a water supply valve (not shown) may be further provided to supply water from the water tank 100 to the ice maker.

Figure 2:
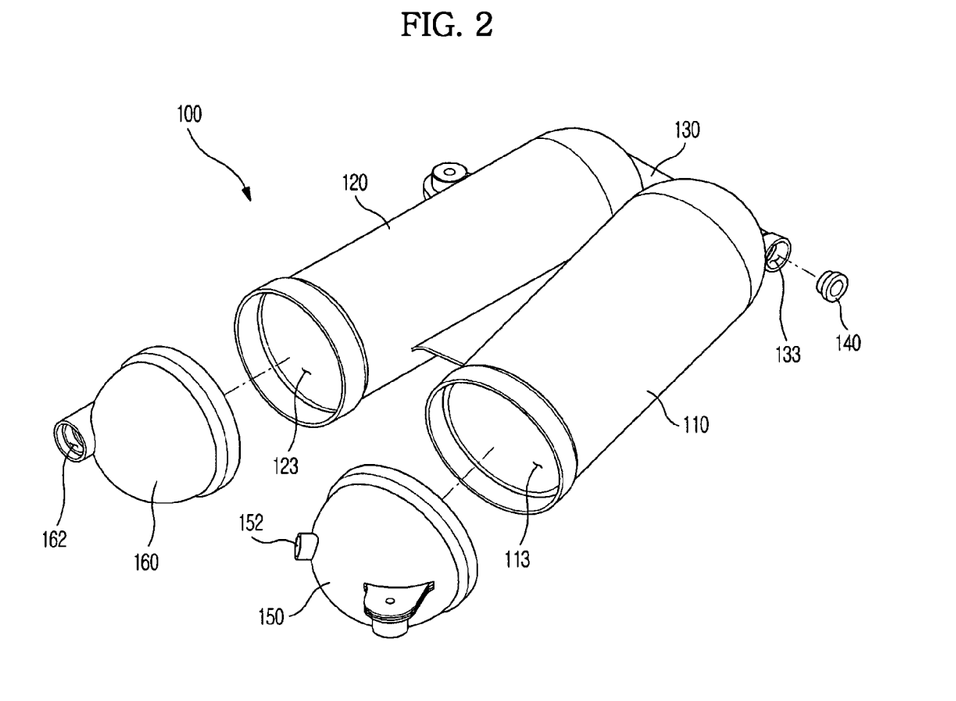
FIG. 2 is an exploded perspective view illustrating a water tank for a refrigerator according to an embodiment.
Figure 3:
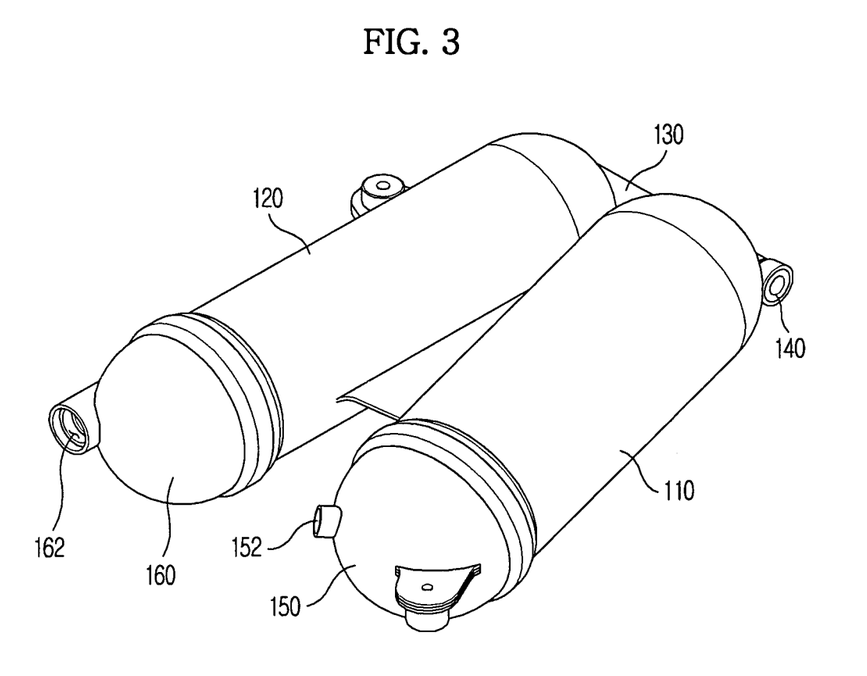
FIG. 3 is a coupled perspective view of the water tank of FIG. 2.
Figure 4:
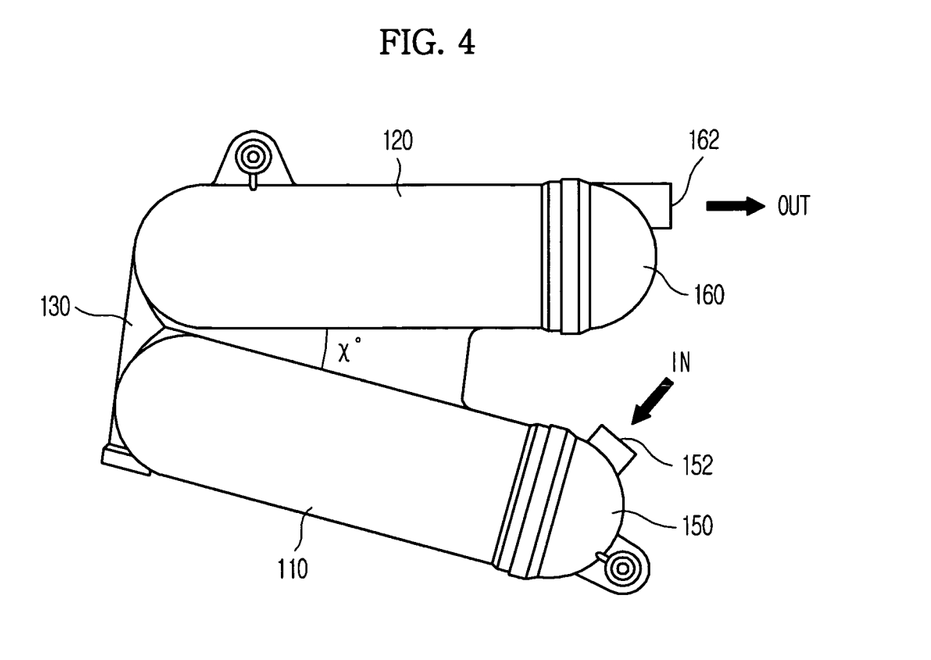
FIG. 4 is a view illustrating the disposition of the water tank.
Figure 5A:
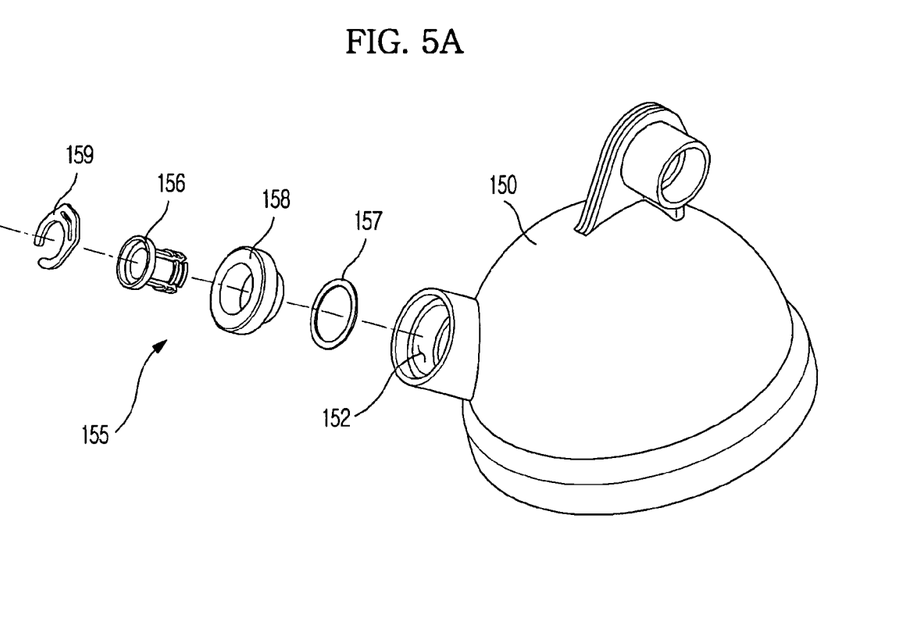
FIG. 5A is a view illustrating an inlet side storage container cap.
Figure 5B:
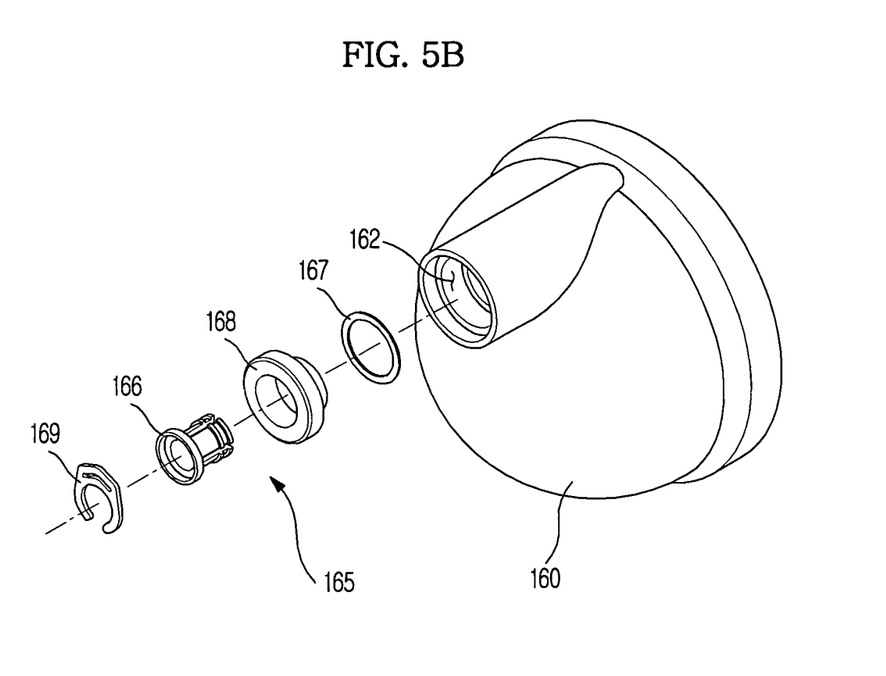
FIG. 5B is a view illustrating an outlet side storage container cap.

FIG. 2 is an exploded perspective view illustrating a water tank for a refrigerator according to an embodiment. FIG. 3 is a coupled perspective view of the water tank of FIG. 2. FIG. 4 is a view illustrating the disposition of the water tank. FIG. 5A is a view illustrating an inlet side storage container cap, and FIG. 5B is a view illustrating an outlet side storage container cap.

As shown in FIGS. 2 to 4, the water tank 100 includes a plurality of water storage containers 110 and 120 to store water, a plurality of water storage container caps 150 and 160 coupled respectively to corresponding ends of the water storage containers 110 and 120, and a communication member 130 through which the water storage containers 110 and 120 communicate with each other.

The water storage containers 110 and 120 include a first water storage container 110 connected to the second water supply pipe 32 to store water introduced from the second water supply pipe 32 and a second water storage container 120 connected to the third water supply pipe 33 to store water to be discharged to the third water supply pipe 33. The water storage containers 110 and 120 have open ends 113 and 123. The other ends of the water storage containers 110 and 120 communicate with each other through the communication member 130.

In this embodiment, the water storage containers 110 and 120 are formed in a circular sectional shape. Alternatively, the water storage containers 110 and 120 may be formed in various different sectional shapes, such as an oval and a quadrangle.

The water storage containers 110 and 120 are disposed horizontally to an installation plane of the refrigerator. A predetermined tilt angle X is defined between the first water storage container 110 disposed relatively above and the second water storage container 120 disposed relatively below. The tilt angle X is provided such that air contained in the water rises along an incline formed by the tilt angle X to be discharged outside.

The water storage containers 110 and 120 and the communication member 130 are integrally formed by injection molding. That is, molten resin is poured between an inner mold and an outer mold to integrally form water storage containers 110 and 120 and the communication member 130. At this time, an opening 133 is formed at one end of the communication member 130 according to the shape of the molds.

The water storage containers 110 and 120 and the communication member 130 are integrally formed by injection molding without an additional joining operation, thereby preventing leakage from the joint and providing the ability to withstand high water pressure.

Also, the water storage containers 110 and 120 and the communication member 130 have uniform thickness and smoothness at inner surfaces thereof, thereby achieving easy removal of air from water.

The water storage container caps 150 and 160 are coupled respectively to the openings of the water storage containers 110 and 120.

The water storage container caps 150 and 160 include a first water storage container cap 150 coupled to the first water storage container 110 and a second water storage container cap 160 coupled to the second water storage container 120. The water storage container caps 150 and 160 are formed in a semicircular shape. The first water storage container cap 150 has an inlet port 152 through which water is introduced. The second water storage container cap 160 has an outlet port 162 through which water is discharged.

The water storage container caps 150 and 160 are joined to the water storage containers 110 and 120 using a welding method. The welding method heats joints to achieve secure joining. The water storage container caps 150 and 160 are forcibly fitted onto the water storage containers 110 and 120 while joints between the water storage container caps 150 and 160 and the water storage containers 110 and 120 are heated to achieve secure joining between the water storage container caps 150 and 160 and the water storage containers 110 and 120. Using the welding method, mutual joining is secured, and leakage from the joints is prevented after use of the water tank for a long time. The welding method is used to prevent such leakage although other kinds of coupling methods may be used.

The communication member 130 serves as a channel through which water introduced into the first water storage container 110 flows to the second water storage container 120 while the water storage containers 110 and 120 communicate with each other through the communication member 130. A leakage prevention cap 140 is coupled to the opening 133 formed at one end of the communication member 130 according to the shape of the molds. The leakage prevention cap 140 is joined to the opening 133 of the communication member 130 by welding in the same manner as the coupling of the water storage container caps 150 and 160 to the water storage containers 110 and 120.

The communication member 130 is integrally formed at the water storage containers 110 and 120 as described above.

As shown in FIGS. 5A and 5B, the water storage container caps 150 and 160 respectively include pipe connections 155 and 165 to which the water supply pipes 31, 32 and 33 are connected.

The second water supply pipe 32 is connected to the first pipe connection 155 of the first water storage container cap 150. The third water supply pipe 33 is connected to the second pipe connection 165 of the second water storage container cap 160.

The pipe connections 155 and 165 respectively include collets 156 and 166 to which the second water supply pipe 32 and the third water supply pipe 33 are directly connected, grommets 157 and 167, made of rubber, to prevent leakage of water around the pipe connections 155 and 165, fixers 158 and 168 to fix the grommets 157 and 167, and clips 159 to prevent movement of the collets 156 and 166.

The connection between the water supply pipes 31, 32 and 33 and the inlet port 152 and the outlet port 162 of the water storage container caps 150 and 160 is achieved by the pipe connections 155 and 165 as described above. Alternatively, the joining between the water supply pipes 31, 32 and 33 and the inlet port 152 and the outlet port 162 of the water storage container caps 150 and 160 may be achieved by welding.

When the water supply pipes 31, 32 and 33 are connected to the water tank 100, water introduced into the inlet port 152 of the first water storage container cap 150 is discharged from the outlet port 162 of the second water storage container cap 160 via the first water storage container 110, the communication member 130, and the second water storage container 120. That is, water flows in a first in first out structure in which water introduced first is discharged first.

In the water tank 100 as described above, the water storage containers 110 and 120 and the communication member 130 are integrally formed by injection molding. Also, the water storage container caps 150 and 160 are joined to the water storage containers 110 and 120, and the leakage prevention cap 140 is joined to the communication member 130, by welding.

As a result, the joints of the water tank are minimized, leakage of water from the water tank is prevented, and the water tank may withstand high water pressure.

Also, the number of components used to manufacture the water tank is decreased according to the minimization of the joints of the water tank, thereby reducing manufacturing costs and improving productivity.

Hereinafter, a water tank for a refrigerator according to another embodiment of the present invention will be described. Components of this embodiment identical to those of the previous embodiment will not be described.

Figure 6:
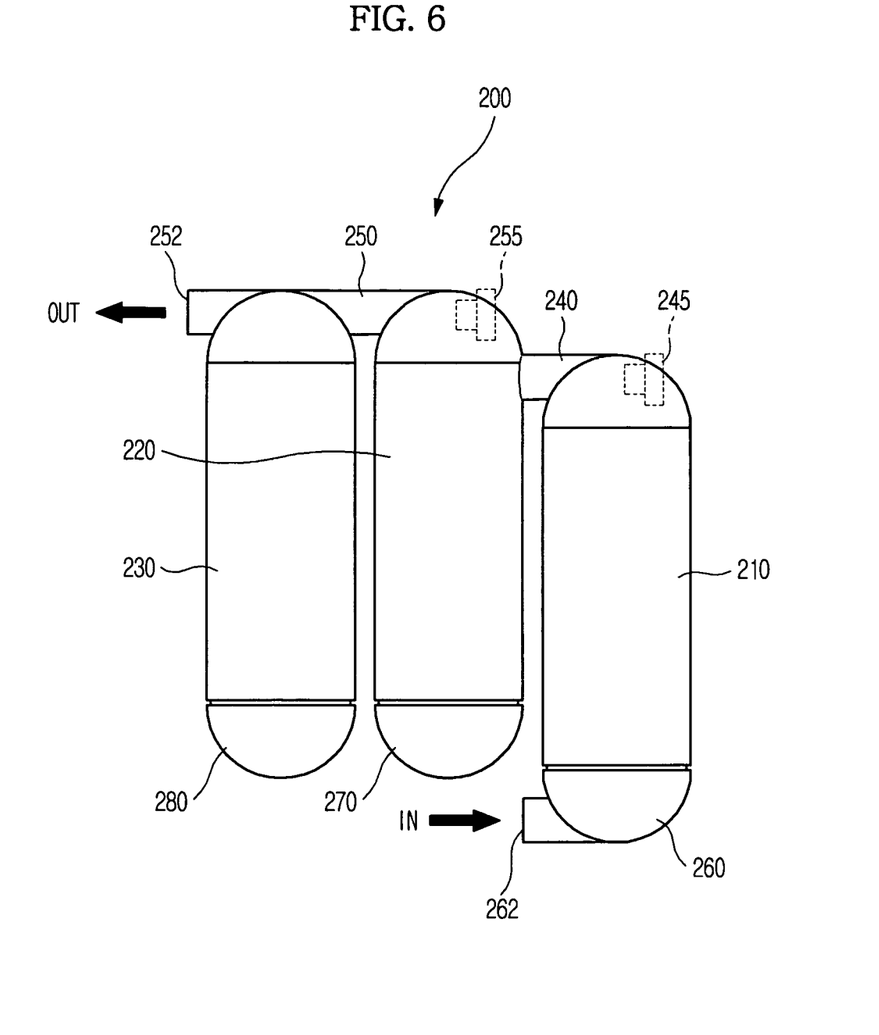
FIG. 6 is a view illustrating a water tank for a refrigerator according to another embodiment.

FIG. 6 is a view illustrating a water tank 200 for a refrigerator according to another embodiment.

As shown in FIG. 6, the water tank 200 is vertically disposed unlike the water tank 100 of the previous embodiment which is horizontally disposed.

Similarly to the previous embodiment, the water tank 200 includes a plurality of water storage containers 210, 220 and 230, communication members 240 and 250 through which the water storage containers 210, 220 and 230 communicate with each other, and water storage container caps 260, 270 and 290 coupled respectively to corresponding ends of the water storage containers 210, 220 and 230. The water storage containers 210, 220 and 230 and the communication members 240 and 250 are integrally formed by injection molding.

The water storage containers 210, 220 and 230 include a first water storage container 210, a second water storage container 220, and a third water storage container 230 which are disposed side by side. The first water storage container cap 260, the second water storage container cap 270, and the third water storage container cap 280 are coupled respectively to corresponding ends of the water storage containers 210, 220 and 230. Joining between the water storage containers 210, 220 and 230 and the water storage container caps 260, 270 and 280 is achieved by welding.

The communication members 240 and 250 include a first communication member 240 through which the first water storage container 210 and the second water storage container 220 communicate with each other and a second communication member 250 through which the second water storage container 220 and the third water storage container 230 communicate with each other. The first communication member 240 and the second communication member 250 respectively include a first leakage prevention cap 245 and a second leakage prevention cap 255 to prevent leakage of water from openings (not shown) formed by injection molding.

In this embodiment, an inlet port 262 through which water from the second water supply pipe 32 is introduced is provided at the first water storage container cap 260, and an outlet port 252 through which water is discharged is provided at the other end of the second communication member 250. The inlet port 262 is disposed below, and the outlet port 252 is disposed above.

Other components of this embodiment are identical to those of the previous embodiment.

Hereinafter, a water supply system of a refrigerator to which a water tank according to a further embodiment of the present invention is applied will be described. Components of this embodiment identical to those of the previous embodiments will not be described.

Figure 7:
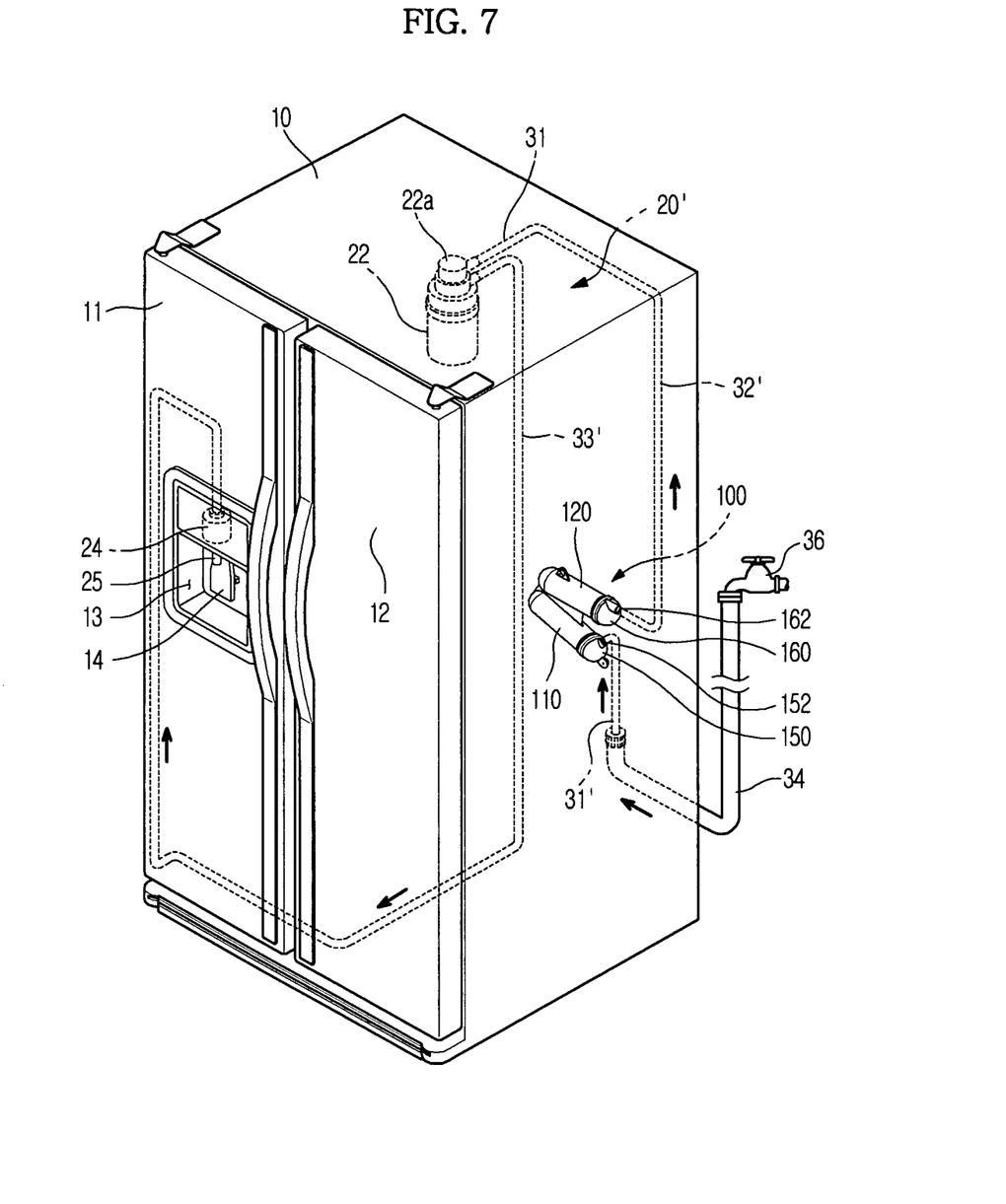
FIG. 7 is a view illustrating a water supply system of a refrigerator according to a further embodiment to which a water tank is applied.

FIG. 7 is a view illustrating a water supply system 20' of a refrigerator according to a further embodiment to which a water tank is applied.

In this embodiment, the water purification filter 22 and the water supply valve 24 are disposed downstream of the water tank 100.

That is, in this embodiment, the water supply source 36 is connected to the inlet port 152 of the water tank 100 via a first water supply pipe 31', the outlet port 162 of the water tank 100 is connected to the water purification filter 22 via a second water supply pipe 32', and the water purification filter 22 is connected to the water supply valve 24 via a third water supply pipe 33'. Consequently, water supplied from the water supply source 36 is dispensed from the water dispensing port 25 via the water tank 100, the water purification filter 22, and the water supply valve 24.

This structure may be used since the water tank 100 withstands high water pressure as previously described.

In this embodiment, water discharged from the water tank 100 passes through the water purification filter 22 by which the water is purified, and therefore, the water from which a smell of the water tank 100 is removed may be dispensed.

Other components of this embodiment are identical to those of the previous embodiments.

As is apparent from the above description, the water storage containers and the communicating member(s) to interconnect the water storage containers are integrally formed by injection molding. Consequently, the water tank withstands high water pressure, and leakage of water from the water tank is prevented.

Also, the number of components to be joined to manufacture the water tank is reduced, thereby reducing manufacturing costs and simplifying the manufacturing process.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A water tank for a refrigerator comprising:
a plurality of water storage containers to store water;
a plurality of water storage container caps respectively coupled to corresponding ends of the water storage containers; and
at least one communication member provided at the other ends of the water storage containers such that the water storage containers communicate with each other through the at least one communication member, wherein the water storage containers and the at least one communication member are seamlessly and integrally formed by injection molding as a single solid piece, and
wherein the at least one communication member comprises at least one leakage prevention cap provided at one end thereof to prevent leakage of water.

2. The water tank according to claim 1, wherein the water storage container caps are joined to the water storage containers by welding.

3. The water tank according to claim 1, wherein the at least one leakage prevention cap is joined to the at least one communication member by welding.

4. The water tank according to claim 1, wherein the water storage containers are formed in at least one sectional shape selected from the group consisting of a circle, an oval and a quadrangle.

5. The water tank according to claim 1, wherein
the water tank is horizontally disposed, and
the water storage containers are inclined to each other to discharge air from water.

6. The water tank according to claim 1, wherein the water tank is vertically disposed.

7. The water tank according to claim 1, further comprising:
an inlet port through which water is introduced and an outlet port through which water is discharged,
wherein the inlet port is disposed at one of the water storage container caps, and
the outlet port is disposed at one of the water storage container caps or the at least one communication member.

8. The water tank according to claim 7, wherein
the inlet port and the outlet port comprise pipe connections to which a water supply pipe is connected, and
each of the pipe connections comprises a collet to which the water supply pipe is connected, a grommet to prevent leakage of water, a fixer to fix the grommet, and a clip to prevent movement of the collet.

9. The water tank according to claim 7, wherein the inlet port and the outlet port are joined to a water supply pipe by welding.

10. A refrigerator comprising:
a dispenser to dispense water; and
a water tank to store water to be supplied to the dispenser, the water tank comprising:
a plurality of water storage containers to store water;
a plurality of water storage container caps respectively coupled to corresponding ends of the water storage containers; and
at least one communication member provided at the other ends of the water storage containers such that the water storage containers communicate with each other through the at least one communication member, wherein
the water storage containers and the at least one communication member are seamlessly and integrally formed as a single solid piece to prevent leakage of water, and
wherein the at least one communication member comprises at least one leakage prevention cap provided at one end thereof to prevent leakage of water.

11. The refrigerator according to claim 10, wherein the water storage container caps are joined to the water storage containers by welding.

12. The refrigerator according to claim 10, wherein the at least one leakage prevention cap is joined to the at least one communication member by welding.

13. The refrigerator according to claim 10, wherein the water storage containers are formed in at least one sectional shape selected from the group consisting of a circle, an oval and a quadrangle.

* * * * *